(12) United States Patent
Vigild et al.

(10) Patent No.: US 9,151,196 B2
(45) Date of Patent: Oct. 6, 2015

(54) DUCTING SYSTEM FOR FEEDING AIR AND EXHAUST GASES TO AN INTERNAL COMBUSTION ENGINE AND FOR DISCHARGING THE EXHAUST GASES PRODUCED BY THE INTERNAL COMBUSTION ENGINE FROM THE INTERNAL COMBUSTION ENGINE

(71) Applicant: Ford Global Technologies, LLC, Dearborn, MI (US)

(72) Inventors: Christian Winge Vigild, Aldenhoven (DE); Yasser Mohamed sayed Yacoub, Cologne (DE); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 13/960,658

(22) Filed: Aug. 6, 2013

(65) Prior Publication Data
US 2014/0047817 A1 Feb. 20, 2014

(30) Foreign Application Priority Data

Aug. 15, 2012 (DE) .......................... 10 2012 214 524

(51) Int. Cl.
*F01N 3/00* (2006.01)
*F02M 25/07* (2006.01)
*F02M 31/02* (2006.01)
*F01N 3/20* (2006.01)
*F01N 3/035* (2006.01)

(52) U.S. Cl.
CPC ............. *F01N 3/00* (2013.01); *F02M 25/0718* (2013.01); *F02M 31/02* (2013.01); *F01N 3/035* (2013.01); *F01N 3/2066* (2013.01); *Y02T 10/121* (2013.01); *Y02T 10/126* (2013.01)

(58) Field of Classification Search
CPC ....... F01N 3/00; F02M 25/0718; F02M 31/02
USPC ..................................................... 60/273, 289
See application file for complete search history.

(56) References Cited

U.S. PATENT DOCUMENTS

| 5,265,418 | A | | 11/1993 | Smith |
| 6,040,557 | A | * | 3/2000 | Prust et al. .................... 219/206 |

(Continued)

FOREIGN PATENT DOCUMENTS

| DE | 102007031768 A1 | 1/2009 |
| EP | 1205647 A1 | 5/2002 |

(Continued)

*Primary Examiner* — Jason Shanske
(74) *Attorney, Agent, or Firm* — Julia Voutyras; Alleman Hall McCoy Russell & Tuttle LLP

(57) ABSTRACT

In one embodiment, a ducting system comprises a feed duct for feeding air and exhaust gases to an internal combustion engine, a discharge duct for discharging the exhaust gases produced by the internal combustion engine from the internal combustion engine, in which one or more exhaust gas aftertreatment units are arranged for aftertreatment of the exhaust gases, and a heating device arranged in the feed duct. The heating device is configured to perform a heating process for preheating the air that is fed to the internal combustion engine. A duration of the heating process and/or heat output given off by the heating device is controlled as a function of a variable approximately representing a state of ageing of at least one of the one or more exhaust gas treatment units.

17 Claims, 4 Drawing Sheets

(56) References Cited

U.S. PATENT DOCUMENTS

| | | | |
|---|---|---|---|
| 2002/0073696 A1* | 6/2002 | Kuenstler et al. | 60/295 |
| 2003/0010022 A1* | 1/2003 | Suzuki | 60/286 |
| 2004/0134192 A1* | 7/2004 | Umehara et al. | 60/605.2 |
| 2006/0289462 A1* | 12/2006 | Muramatsu et al. | 219/501 |
| 2009/0320788 A1* | 12/2009 | Ohtsubo et al. | 123/295 |
| 2011/0146233 A1* | 6/2011 | Carlill et al. | 60/274 |
| 2011/0146244 A1* | 6/2011 | Farman et al. | 60/285 |
| 2011/0146245 A1* | 6/2011 | Farman et al. | 60/286 |
| 2011/0146246 A1* | 6/2011 | Farman et al. | 60/286 |
| 2011/0259290 A1* | 10/2011 | Michikawauchi et al. | 123/1 A |
| 2012/0023935 A1* | 2/2012 | Pursifull et al. | 60/605.2 |
| 2012/0180478 A1* | 7/2012 | Johnson et al. | 60/605.2 |
| 2013/0269327 A1 | 10/2013 | Keppeler | |

FOREIGN PATENT DOCUMENTS

| | | |
|---|---|---|
| WO | 0034643 A1 | 6/2000 |
| WO | 2005035967 A1 | 4/2005 |

* cited by examiner

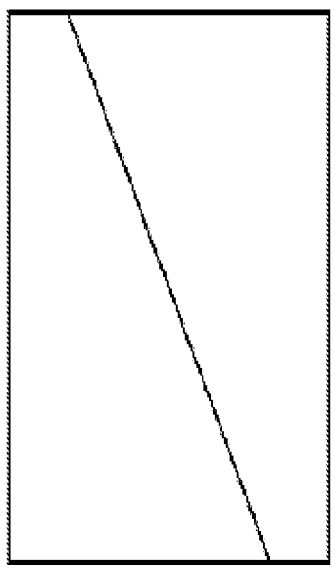
FIG. 3a)
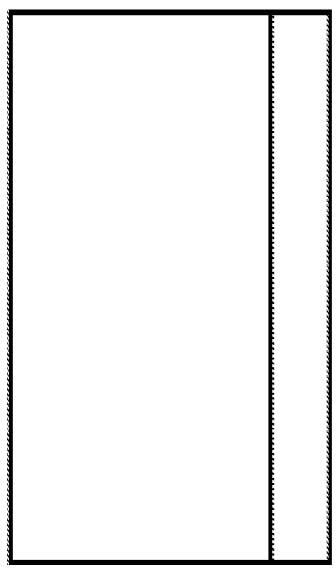
FIG. 3c)
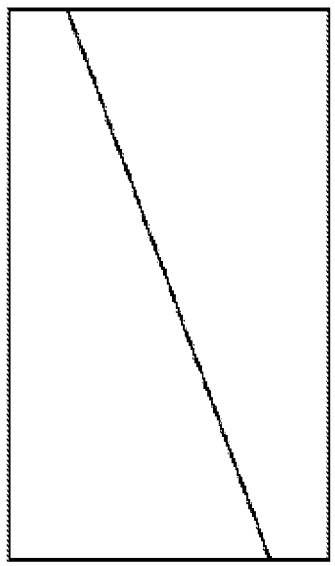
FIG. 3b)
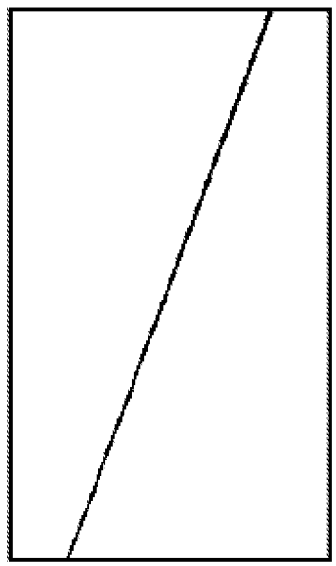
FIG. 3d)
FIG. 3

DUCTING SYSTEM FOR FEEDING AIR AND EXHAUST GASES TO AN INTERNAL COMBUSTION ENGINE AND FOR DISCHARGING THE EXHAUST GASES PRODUCED BY THE INTERNAL COMBUSTION ENGINE FROM THE INTERNAL COMBUSTION ENGINE

CROSS REFERENCE TO RELATED APPLICATIONS

The present application claims priority to German Patent Application No. 102012214524.9, filed on Aug. 15, 2012, the entire contents of which are hereby incorporated by reference for all purposes.

FIELD

The present disclosure relates to a ducting system for feeding air and/or exhaust gases to an internal combustion engine and for discharging the exhaust gases produced by the internal combustion engine from the internal combustion engine.

BACKGROUND/SUMMARY

In order to be able to meet the increasingly stringent statutory environmental protection requirements such as LEV in the USA or EU6 or EU7 in the European Union, the exhaust gases of an internal combustion engine, for example a spark-ignition or diesel engine, used to power motor vehicles, may be treated so that the pollutant emissions of the internal combustion engine remain below prescribed maximum limits. In the case of spark-ignition engines, for example, catalytic reactors are used as exhaust gas aftertreatment units which, by using catalytic materials that increase the speed of specific reactions, ensure the oxidation of hydrocarbons (HC) and carbon monoxide (CO), for example. Oxidation of the unburned hydrocarbons and carbon monoxide relies, in particular, on the provision of an oxidation catalytic converter in the exhaust gas flow.

The ageing of catalytic converters used as exhaust gas aftertreatment units constitutes a common problem. These catalytic converters have a coating of noble metals, which is consumed as the number of operating hours of the engine and/or catalytic converter increases. In order to be able to meet the aforementioned environmental protection requirements even after a high number of operating hours, the catalytic converters are furnished with excess noble metal, which particularly in the context of an overall increase in the cost of raw materials makes manufacture of the catalytic converters more expensive and does not really solve the problem of ageing but merely defers it.

The inventors herein have recognized the above issues and have developed a ducting system so that the relevant environmental protection requirements can be met by the catalytic converters used for exhaust gas aftertreatment even after a high number of operating hours, without needing to provide an excess of noble metal. In this way, the problem of ageing of the catalytic converters may be counteracted.

Accordingly, a ducting system for feeding air and exhaust gases to an internal combustion engine and for discharging the exhaust gases produced by the internal combustion engine from the internal combustion engine is provided. In one embodiment, the ducting system comprises a feed duct for feeding the air and exhaust gases to the internal combustion engine, a discharge duct for discharging the exhaust gases produced by the internal combustion engine from the internal combustion engine, in which one or more exhaust gas aftertreatment units are arranged for aftertreatment of the exhaust gases, and a heating device arranged in the feed duct. The heating device is configured to perform a heating process for preheating the air that is fed to the internal combustion engine. A duration of the heating process and/or heat output given off by the heating device is controlled as a function of a variable approximately representing a state of ageing of at least one of the one or more exhaust gas treatment units.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3a-d show diagrams for the simplified representation of the correlation between emissions and ageing of the exhaust gas aftertreatment unit and emissions and the duration of preheating, together with the preheating and the inventive control of the preheating time over the operating hours or mileage and their effect on ageing.

DETAILED DESCRIPTION

Figure 1:
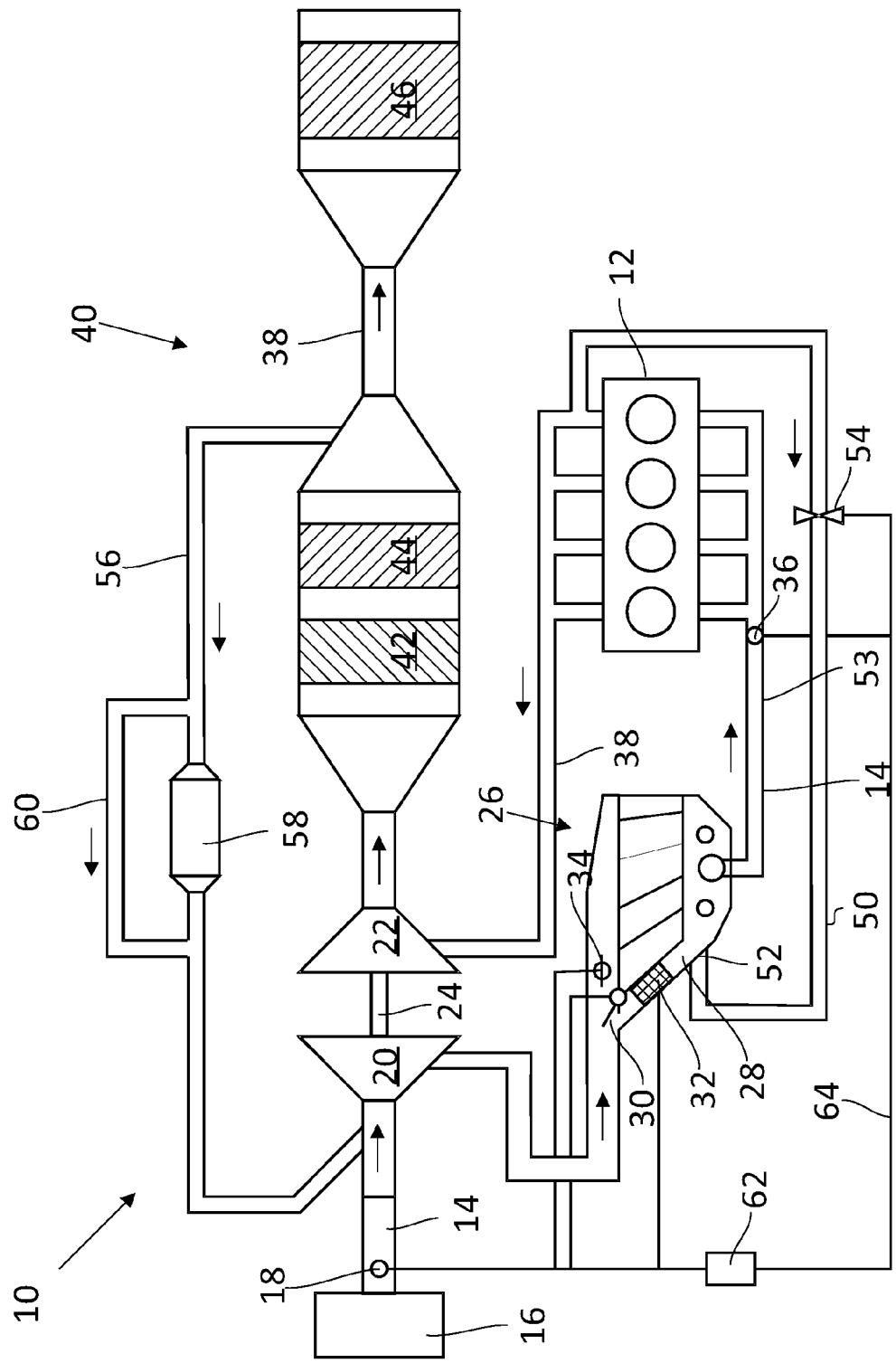
FIG. 1 shows a schematic representation of a first exemplary embodiment of a ducting system according to the disclosure.

By providing a heating device, which is arranged in the feed duct and which performs a heating process for preheating the air that is fed to the internal combustion engine, and which is set up so that the duration of the heating process and/or the heat output introduced into the air by the heating device during the heating process is controlled as a function of a variable approximately representing the state of ageing of at least the one exhaust gas treatment unit, preferably as a function of the number of operating hours of the internal combustion engine and/or the exhaust gas aftertreatment units and/or the mileage, it is possible on the one hand to shorten the warm-up phase of the internal combustion engine, and to bring the catalytic converters used for exhaust gas aftertreatment up to their operating temperature more rapidly.

Operating hours is intended to signify the length of time during which the internal combustion engine is capable of delivering a torque. Where the internal combustion engine is embodied as a diesel or spark-ignition engine of a vehicle, the mileage of the vehicle rather than the number of operating hours may also be used as reference variable for setting the duration of the heating process or the heat energy introduced into the air.

Other feasible variables approximately describing the state of ageing of the exhaust gas treatment device include the air mass flow through the exhaust gas treatment device integrated over the total running time, which if need be may also be weighted by an exponentially exhaust gas temperature-dependent term, and thus represents a measure of the chemical reaction events that have hitherto occurred on the exhaust gas treatment device.

The preheating on the one hand causes the internal combustion engine to produce a reduced concentration of CO and HC, and on the other the catalytic converters reach a higher conversion rate more rapidly. The concentration of CO and HC in the exhaust gas is reduced and the catalytic converters are less heavily stressed.

With an increasing number of operating hours or increasing mileage, the performance of the exhaust gas aftertreatment units declines, so that exhaust emissions increase. Surprisingly it has emerged, however, that the decline in performance can be significantly reduced by varying and preferably increasing the duration of the heating process and/or the heat energy introduced into the air during the heating process as the number of operating hour increases. This means, on the other hand, that the exhaust emissions can be kept largely constant over a large number of operating hours and the environmental protection requirements met, without having to provide the exhaust gas aftertreatment units in the form of catalytic converters with excess noble metal.

The heating device may be embodied, for example, as a grid heating element ("Grid Heater"), as is represented in WO 00/34643 or in WO 2005/035967, for example. Such a heating device may interact with a control unit, for example, so that the duration of the heating process and the heat output given off during this can be varied as a function of the age of the exhaust gas aftertreatment unit.

A distinctive feature of one preferred embodiment of the ducting system according to the disclosure is an exhaust gas recirculation duct for returning the exhaust gases from the discharge duct into the feed duct. Reducing the emissions of nitrogen oxides ($NO_X$) constitutes a particular problem. A common means for reducing the nitrogen oxide emission, particularly in diesel engines, is a selective catalytic reduction catalytic converter (SCR catalytic converter), in which a reducing agent containing ammonia is used as reaction fluid to reduce $NO_X$ to nitrogen ($N_2$) and water ($H_2O$), the reaction fluid being introduced into the discharge duct of the ducting system by means of the feed device upstream of the SCR catalytic converter and there brought into contact with the exhaust gas. However, the environmental protection requirements cannot be met solely by such exhaust gas after treatment. In diesel engines, in particular, exhaust gas recirculation is one of the most important measures for reducing the nitrogen oxide emissions. The exhaust gas contains less oxygen than the unused air fed to the internal combustion engine. The mixture of air and exhaust gas produced by exhaust gas recirculation, which is fed to the internal combustion engine, has a reduced oxygen concentration. This can result, however, in incomplete combustion, which leads to a reduced power output from the internal combustion engine and to an increase in the emission of pollutant exhaust gases. In order to prevent this, the volumetric flow of intake air may be increased, in order to provide a sufficient oxygen concentration. This reduces the combustion temperature and the reaction rate of $NO_X$ formation, so that although the exhaust gas recirculation is capable of ensuring complete combustion of the fuel molecules, the formation of $NO_X$ is reduced. This effect can be enhanced by the provision of coolers, which cool the recirculated exhaust. A ducting system provided with coolers is disclosed in DE 10 2010 050 413.

In a development of the ducting system according to the disclosure the exhaust gas recirculation duct opens out in a discharge orifice into the feed duct, the heating device being arranged upstream of the discharge orifice. In this case only the air, but not the recirculated exhaust gas, is directly preheated by the heating device. The temperature of the recirculated exhaust gas is indirectly altered by the preheated air. The air is generally cleaner than the exhaust gases, so that with this arrangement fewer, if any, deposits can form on the heating device. Consequently the heating device needs to be cleaned less often, if at all, and its efficiency is not reduced by deposits.

In another embodiment the exhaust gas recirculation duct opens out in a discharge orifice into the feed duct, the heating device being arranged downstream of the discharge orifice. In this case both the exhaust gas and the air are directly heated by the heating device. The temperature of the mixture of exhaust gas and air, which is fed to the internal combustion engine, can therefore be readily controlled irrespective of the mixture ratio.

An air filter for filtering the air is preferably arranged in the feed duct, with a bypass duct for bypassing the air filter, the heating device being arranged in the bypass duct. The air filter filters substances out of the air which have a negative effect on the combustion in the internal combustion engine. The heating device is arranged in the bypass duct in order to prevent a thermal overload of the air filter.

In a further development of the ducting system according to the disclosure, a throttle valve for regulating the power output of the internal combustion engine is arranged in the feed duct, the heating device being arranged downstream of the throttle valve. Turbulence or pressure losses in the flow make it more difficult to regulate the power output. In this development the flow of air or the mixture of air and exhaust gases is not disturbed by the throttle valve, allowing the power output to be regulated precisely.

It is advantageous if a temperature control module for controlling the temperature of the air and/or the exhaust gases in the feed duct is arranged in the feed duct. Here the temperature control module interacts with the heating device and activates it accordingly. As already mentioned at the outset, the aim of the present disclosure is to achieve the fullest possible combustion of CO and HC and to reduce the formation of $NO_X$. The completeness of the combustion and the concentration of $NO_X$ produced both vary greatly as a function of the temperature, so that a precise control of the temperature of the air and/or of the exhaust gases in the feed duct has a considerable influence on the exhaust emissions. Consequently, in this embodiment it is possible, to an exceptional degree, to set the required reaction conditions having the desired effects on the exhaust emissions, so as to be able to meet the environmental protection requirements.

In this case it is advantageous if the temperature control module comprises a temperature sensor for registering the temperature of the air and/or the exhaust gases in the feed duct. For this purpose the temperature sensor is arranged downstream of the heating device, advantageously in the immediate vicinity of the internal combustion engine, so that the temperature of the air and/or of the mixture of air and exhaust gas flowing into the internal combustion engine can be accurately registered and adjusted through corresponding activation of the heating device by the temperature control module. In this case it is feasible to regulate the temperature so as to allow an especially low-emission mode of operation.

A distinctive feature of one particular embodiment is an air intake sensor arranged in the feed duct for registering the volumetric flow of the air flowing into the feed duct. The volumetric flow and therefore the mass of the air fed to the internal combustion engine has a great influence on the thermodynamic behavior of the internal combustion engine itself and the exhaust gas aftertreatment unit. This makes it possible, on the one hand, to predict the warm-up behavior of the internal combustion engine and the exhaust gas aftertreatment unit and to select the setting of the heating device accordingly. If the ducting system comprises an exhaust gas recirculation duct, the mixture ratio between the air and exhaust gas can be precisely defined, making it possible to further reduce the exhaust emissions.

The ducting system according to the disclosure furthermore preferably comprises a compression device, arranged in the feed duct, for compressing the air and/or the exhaust gases which are fed to the internal combustion engine, and an expansion device, arranged in the discharge duct, for expansion of the exhaust gases. Compression serves to increase significantly the power delivered by the internal combustion engine, without markedly increasing the fuel consumption.

The exhaust gases in the compressed state are preferably returned from the discharge duct into the feed duct via the exhaust gas recirculation duct. This can be easily achieved in that the exhaust gas recirculation duct branches off from the discharge duct upstream of the expansion unit and opens out into the feed duct downstream of the compression unit. In this case a high-pressure exhaust gas recirculation is achieved, for which purpose a delivery unit, which in this case does not have to compress the exhaust gas so that it can be introduced into the feed duct, may be provided in the exhaust gas recirculation duct.

In an advantageous development the ducting system comprises a second exhaust gas recirculation duct, which branches off from the discharge duct downstream of the expansion device and opens into the feed duct upstream of the compression device, so that the exhaust gases are returned into the feed duct in the expanded state. In this case a low-pressure exhaust gas recirculation is achieved, which serves the same purpose as the high-pressure exhaust gas recirculation. Depending on the operating state and power output of the internal combustion engine it may be more advantageous to activate the high-pressure or the low-pressure exhaust gas recirculation, or both.

One or more emission control devices are preferably arranged in the second exhaust gas recirculation duct. It is therefore possible to rid the recirculated exhaust gas of substances which have a negative effect on the combustion in the internal combustion engine. The emission of pollutant substances in the exhaust gas can thereby be further reduced.

A further aspect of the disclosure relates to an internal combustion engine, comprising a ducting system according to one of the preceding exemplary embodiments and to a vehicle having such an internal combustion engine. The advantages and technical effects that can be obtained by the internal combustion engine according to the disclosure and the correspondingly equipped vehicle correspond to those which have been described for the ducting system according to the disclosure.

An object is further achieved by a method for operating a ducting system according to one of the embodiments previously described, which comprises the following steps:
  feeding the air and exhaust gases to the internal combustion engine by means of a feed duct,
  discharging the exhaust gases produced by the internal combustion engine from the internal combustion engine by means of a discharge duct,
  aftertreatment of the exhaust gases by means of one or more exhaust gas aftertreatment units arranged in the discharge duct, and
  preheating the air and/or the exhaust gases that are fed to the internal combustion engine by means of a heating device arranged in the feed duct.

The advantages and technical effects that can be obtained by the method according to the disclosure correspond to those which have been described for the ducting system according to the disclosure.

The method is developed in that the preheating step is performed only until the internal combustion engine and/or the exhaust gas aftertreatment units have reached their operating temperature. If the internal combustion engine has not yet reached its operating temperature, the proportion of incompletely burned fuel increases, so that the HC and CO concentrations in the exhaust gas increase. If the internal combustion engine has not yet reached its operating temperature, the exhaust gas aftertreatment units have usually also not yet reached their operating temperatures, so that they are even less able to convert the HC and CO molecules then increasingly produced into harmless compounds. In order to bring both the internal combustion engine and the exhaust gas aftertreatment units rapidly up to operating temperature, and to reduce the HC and CO emissions, the preheating step is performed in the warm-up phase of the internal combustion engine and the exhaust gas aftertreatment units. The operating temperature of the exhaust gas aftertreatment units or the internal combustion engine may be used as reference, depending on the influence on the HC and CO emissions. If the internal combustion engine is embodied as a spark-ignition or diesel engine of a vehicle, the preheating step is primarily performed immediately after starting up the internal combustion engine when driving off, although it may also be performed if the temperature of the exhaust gas aftertreatment units drops below the operating temperature whilst underway.

In order to reduce fuel consumption, increasing use is made nowadays of automatic start-stop systems, in which the internal combustion engine is switched off when the vehicle is stationary and switched on again when power is required. Whereas the internal combustion engine in this case has usually scarcely cooled and therefore rapidly reaches its operating temperature again, the temperature of the exhaust gas aftertreatment unit can fall sharply when the internal combustion engine is switched off. In order to bring the temperature of the exhaust gas aftertreatment unit rapidly back up to the operating temperature, the preheating may be performed at other times and not only immediately after driving off. In this case, if exhaust gas recirculation is provided, this is switched off.

On reaching the operating temperatures, preheating would be useless and even counterproductive, since, as stated previously, a cooling of the recirculated exhaust gas can reduce the formation of $NO_X$. However, the provision of a heating device is not inconsistent with a cooling of the recirculated exhaust gas, provided that preheating and cooling are coordinated with one another.

A distinctive feature of a further embodiment of the method is that the preheating step is performed for a period of time which extends beyond the point at which the internal combustion engine and/or the exhaust gas aftertreatment units have reached their operating temperature, wherein the period of time is increased with the number of operating hours of the internal combustion engine and/or the exhaust gas aftertreatment units. Where the internal combustion engine is embodied as a diesel or spark-ignition engine of a vehicle, the mileage of the vehicle, rather than the number of operating hours, may also be used as reference variable for increasing the period of time. As the number of operating hours or the mileage increases, the performance of the exhaust gas aftertreatment units declines, with the result that exhaust emissions increase. Surprisingly, it has emerged, however, that the decline in performance can be significantly reduced by increasing the preheating step as the number of operating hours increases. It is therefore possible to keep the exhaust emissions largely constant over a large number of operating hours and to meet the environmental protection requirements, without having to provide the exhaust gas aftertreatment units in the form of catalytic converters with excess noble metal.

In a further development the method according to the disclosure comprises the following step:

recirculation of the exhaust gases from the discharge duct into the feed duct by means of an exhaust gas recirculation duct.

As already mentioned at the outset, it may be advantageous for the reduction of $NO_X$ emissions to recirculate the exhaust gas, to mix it with the inlet air and to return it to the internal combustion engine again. In this development of the method according to the disclosure, therefore, both the inlet air and the mixture of inlet air and exhaust gas can be preheated. The air fed to most modern internal combustion engines is compressed, so that the exhaust gas is also returned in the compressed state. Depending on the design of the ducting system, however, a low-pressure exhaust gas recirculation may also be performed. The use made of the heating device does not depend on the type of exhaust gas recirculation. However, the effect of reducing the $NO_X$ emissions is based on a cooling of the mixture of inlet air and recirculated exhaust gases, so that the control unit may be set up to perform the preheating only when exhaust gas recirculation is not in progress. In particular, no exhaust gas recirculation is performed immediately after starting up the internal combustion engine.

FIG. 1 schematically represents a first exemplary embodiment of a ducting system 10 according to the disclosure for feeding air and exhaust gases to an internal combustion engine 12, which in some examples may be installed in a vehicle, and for discharging the exhaust gases produced by the internal combustion engine 12 from the internal combustion engine 12. The ducting system 10 comprises a feed duct 14 for feeding air to the internal combustion engine 12, which in the example shown is designed as a diesel engine. The feed duct 14 comprises an intake portion 16, via which the air is introduced into the feed duct 14 from the surroundings. In order to be able to register the volumetric flow of the air flowing into the feed duct 14, an air intake sensor 18 is arranged downstream of the intake portion 16. The air flowing in is compressed by means of a compression device 20, which is driven by an expansion device 22, for which purpose the compression device 20 and the expansion device 22 are connected to a shaft 24. The compressed air flows onwards from the compression device 20 to an air filter 26, where it is freed of particles. The air filter 26 comprises a bypass duct 28, via which the air can flow onwards, entirely or partially bypassing the air filter 26. The quantity of air flowing through the bypass duct 28 is regulated by a control flap 30. Arranged in the bypass duct 28 is a heating device 32, which serves to heat the inflowing air to the designated temperature. Also arranged upstream of the air filter 26 is a temperature control module 34, which serves to register the temperature of the inflowing air and to adjust this through corresponding activation of the heating device 32. Should the temperature of the inflowing air be too high, the temperature control module 34 activates the control flap 30, so that the air is led mainly through the bypass duct 28, in order to prevent a thermal overload of the air filter 26.

The feed duct 14 continues downstream of the air filter 26 and carries the air to the internal combustion engine 12, where the feed duct 14 terminates. A temperature sensor 36 is arranged in the feed duct 14 in immediate proximity to the internal combustion engine 12, in order to measure the temperature of the air flowing into the internal combustion engine 12. In the internal combustion engine 12 the air is burned together with the fuel, which is fed to the internal combustion engine 12 via a device (not shown), so that exhaust gases are produced, which are discharged via a discharge duct 38. The exhaust gas first flows through the expansion device 22, where the exhaust gas is expanded, and the shaft 24 is driven, thereby in turn setting the compression device 20 in rotation for compressing the air. After expansion, the exhaust gas flows to an exhaust gas aftertreatment unit 40, which in the case of a diesel engine shown comprises a diesel oxidation catalytic converter 42 (DOC), a diesel particulate filter 44 (DPF) and an SCR catalytic converter 46 (selective catalytic reduction catalytic converter). The after-treated exhaust gas then passes into the surroundings via an exhaust 48.

The ducting system 10 comprises an exhaust gas recirculation duct 50, which branches off from the discharge duct 38 downstream of the internal combustion engine 12 and opens into the feed duct 14 via a discharge orifice 52 upstream of the internal combustion engine 12. It is thereby possible to mix exhaust gas with the air in a specific ratio and to feed the mixture to the internal combustion engine 12, so that the $NO_X$ concentrations produced during combustion can be reduced. A check valve 54 is arranged in the exhaust gas recirculation duct 50 for alternatively performing or interrupting the exhaust gas recirculation. Since compressed exhaust gas is recirculated, this method of exhaust gas recirculation is also known as high-pressure exhaust gas recirculation.

The ducting system 10 further comprises a second exhaust gas recirculation duct 56, which branches off from the discharge duct 38 downstream of the diesel particulate filter 44 and opens into the feed duct 14 upstream of the compression device 20. In this case the expanded exhaust gas is recirculated, making this a low-pressure exhaust gas recirculation. A suitable emission control device 58, which serves to rid the recirculated exhaust gas of substances detrimental to the combustion, is arranged in the second exhaust gas recirculation duct 56. However, the emission control device 58, possibly a catalytic converter or a particulate filter, can be by-passed by a second bypass duct 60 in the event of a failure or an excessive pressure loss.

For easier understanding of the disclosure, the direction of flow of the air and the exhaust gas is identified by arrows.

In order to actuate the heating device 32 according to the operating conditions prevailing at any given moment, a control unit 62 is provided, which is connected to the air intake sensor 18, the temperature control module 34 and the temperature sensor 36, for example, either wirelessly or, as shown, via electrical leads 64. In this case the temperature control module 34 can be designed separately, as shown, or it may be integrated into the control unit 62. The control unit 62 is furthermore capable of activating the check valve 54, in order to permit or to prevent exhaust gas recirculation. Furthermore the check valve 54 can be set up so that the quantity of recirculated exhaust gas is variable. FIG. 1 shows just some of the possibilities for which the control unit 62 can be used. Other possibilities are feasible.

Figure 2:
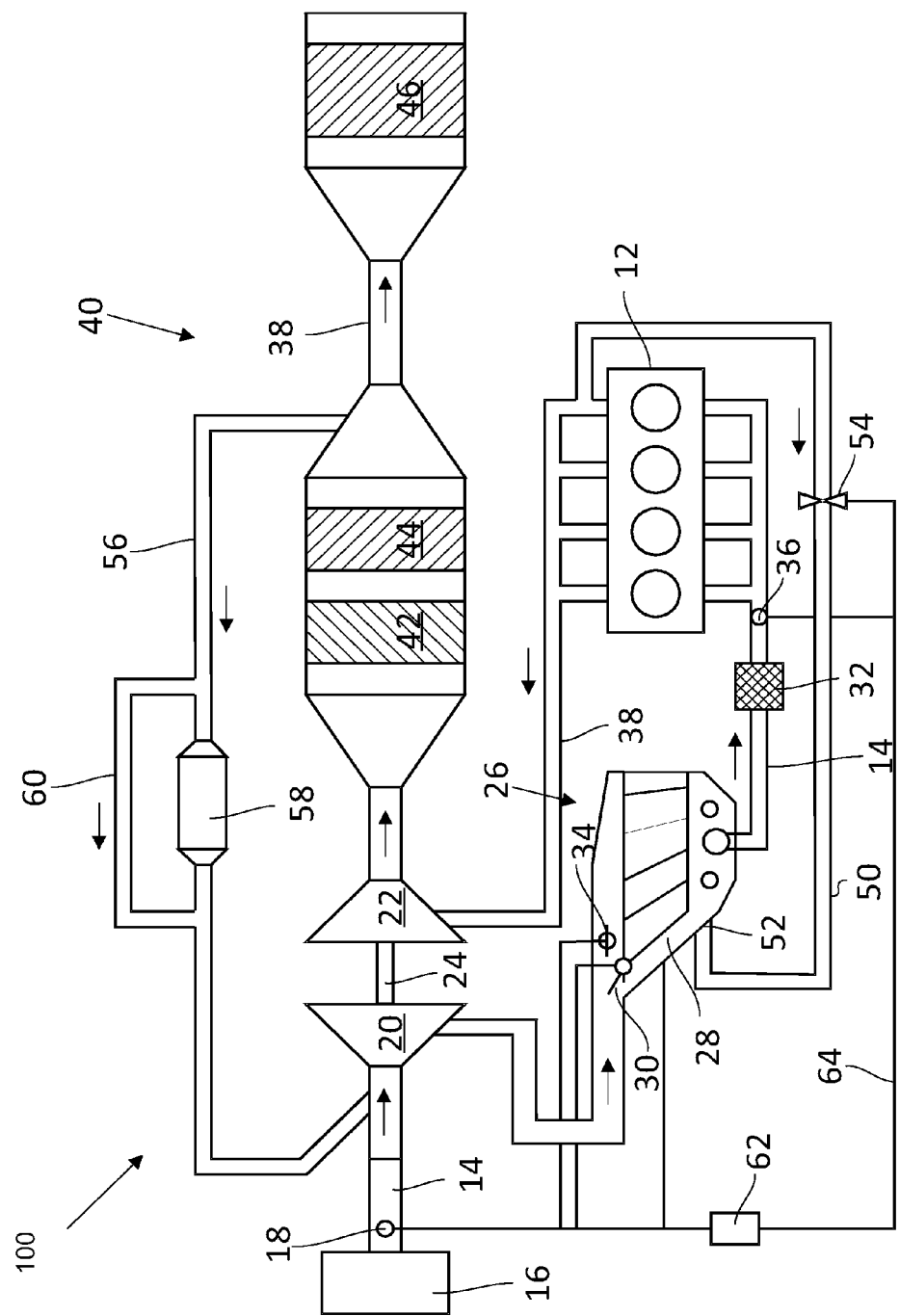
FIG. 2 shows a schematic representation of a second exemplary embodiment of a ducting system according to the disclosure.

FIG. 2 represents a second exemplary embodiment of a ducting system 100 according to the disclosure. It differs from the first exemplary embodiment only in the arrangement of the heating device 32, which is arranged downstream of the air filter 26 just before the end of the feed duct 14. The distance between the heating device 32 and the internal combustion engine 12 is therefore shorter, so that the heat losses are reduced.

The control unit 62 is preferably programmed so that it performs the method according to the disclosure, in which the heating device 32 is operated only until the internal combustion engine 12 and/or the exhaust gas aftertreatment units 40 have reached their operating temperatures. Which of the two operating temperatures is used for this purpose may be determined, for example, by which of the two operating temperatures is reached later, or according to which temperature is more easily measureable or more representative. In order to determine whether the operating temperatures have been reached, the control unit 62 may take into account the temperature of the air in the feed duct 14 and the volumetric flow of the air, other determining methods, for example the oil temperature of the internal combustion engine 12, also being feasible.

Alternatively the control unit 62 may determine the number of operating hours of the internal combustion engine 12 or the exhaust gas aftertreatment units 40, for which purpose the volumetric flow can also be used. Provided that a volumetric flow is present, operation can be assumed and registered as operating time. Alternatively the control unit 62 may take account of the mileage of the vehicle. The heating device 32 is operated beyond the point at which the internal combustion engine 12 and/or the exhaust gas aftertreatment units 40 have reached their operating temperatures. The length of time beyond this point is increased as a predetermined function of the mileage or the number of operating hours.

The various correlations of the main variables, on which the disclosure is based, are collated in FIGS. 3a-c. It can be seen from FIG. 3a that, without preheating of the inlet air, the pollutant emissions, here exemplified by CO and HC, increase with greater ageing of the exhaust gas aftertreatment unit, as is the case with known exhaust gas aftertreatment units. The ageing is quantified by the operating hours of the exhaust gas aftertreatment unit or, where the internal combustion engine powers a vehicle, by the mileage.

FIG. 3b illustrates the influence of preheating on the CO and HC pollutant emissions. The longer the inlet air is heated, the closer the internal combustion engine and exhaust gas aftertreatment unit come to their operating temperatures, which leads to diminishing CO and HC pollutant emissions.

FIG. 3c represents one of the methods according to the disclosure for adjusting the duration of preheating as a function of the operating hours of the exhaust gas aftertreatment unit or the mileage of the vehicle. According to the disclosure the duration of the preheating is increased as the number of operating hours increases or as the mileage of the vehicle increases. As consequence of this, the increase in pollutant emissions, represented in FIG. 3a, due to greater ageing of the exhaust gas aftertreatment unit, is at least abated or even completely eliminated by the effect represented in FIG. 3b, so that the environmental protection requirements can still be met even with a high number operating hours or a high mileage. In an ideal case a level of pollutant emissions independent of the operating hours or the mileage is achieved, as is represented in FIG. 3d.

Figure 4:
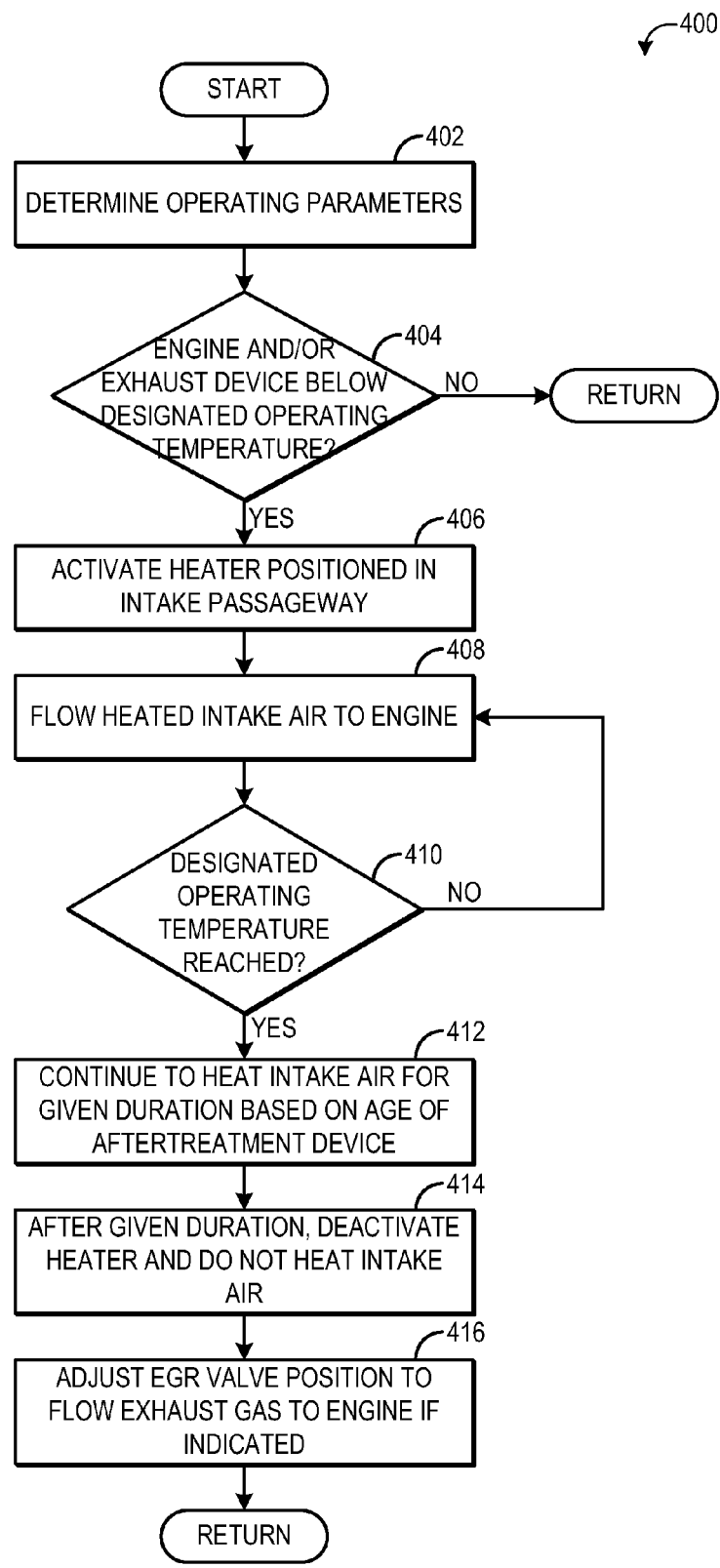
FIG. 4 is a flow chart illustrating a method for heating intake air according to an embodiment of the present disclosure.

Turning now to FIG. 4, a method 400 for heating intake air is presented. Method 400 may be carried out by a controller, such as control unit 62, according to instructions stored thereon. Method 400 controls activation of a heater positioned in an engine intake passageway, such as heater 32, based on an age of an exhaust aftertreatment device.

At 402, method 400 includes determining operating parameters. The determined operating parameters may include, but are not limited to, engine temperature, intake air temperature, engine speed and load, exhaust temperature, exhaust gas recirculation (EGR) valve position, and other parameters. At 404, it is determined if an engine and/or exhaust aftertreatment device temperature is below a designated temperature. Both the engine and the exhaust aftertreatment device may have a respective operating temperature at which each performs at an optimal level. For example, the engine may have a designated operating temperature (e.g., 150° C.) below which fuel efficiency is compromised and/or emissions are above a certain level. Further, the exhaust aftertreatment device may have a light-off temperature (e.g., 350° C.) below which conversion of exhaust emissions does not occur, or does not occur with suitable efficiency. When the engine and/or exhaust aftertreatment device is below its respective operating temperature, the engine may operate in a warm-up phase to heat the engine and/or exhaust. The warm-up phase may include bypassing engine coolant around a radiator, operating with a particular air-fuel ratio, etc. The warm-up phase may begin during an engine cold start from rest at ambient conditions until a catalyst reaches a selected light-off temperature.

If it is determined that the engine and/or exhaust aftertreatment device is not operating below the designated temperature, method 400 returns. If the engine and/or aftertreatment device is operating below the designated temperature, during the warm-up phase of the engine, a heater positioned in a passageway of the intake is activated, as indicated at 406. At 408, intake air heated by the heater is directed to or otherwise flows to the engine. The heated intake air will rapidly warm the engine and the exhaust.

At 410, it is determined if the engine and/or the exhaust aftertreatment device has reached the designated temperature. If no, method 400 loops back to 408 to continue to flow heated intake air to the engine. If the engine and/or exhaust aftertreatment device has reached the designated temperature, method 400 proceeds to 412 to continue to heat the intake air for a given duration. The given duration is a period of time based on the age of the exhaust aftertreatment device. For example, as explained above with respect to FIGS. 3a-3d, as the aftertreatment device ages, the amount of catalyst (e.g., noble metal) available for reaction with the exhaust constituents decreases, thus decreasing the conversion efficiency of the aftertreatment device. However, by heating the intake air, the amount of exhaust constituents, such as CO and H, produced by the engine decreases. Thus, by heating the intake air for a duration even after the engine and/or aftertreatment device has reached operating temperature, the production of constituents may be decreased. The duration of the heating after the engine/aftertreatment device has reached operating temperature may be a linear function of the age of the aftertreatment device. The duration may commence only after the designated operation temperature is reached at 410, and such additional heating may only be used duration selected conditions, such as during engine warm-up, in one example. As such, as the age of the aftertreatment device increases, the amount of the duration that intake air continues to be heated increases. In one example, the amount of time increases non-linearly with the amount of age increase.

At 414, after the given duration, the heater is deactivated and the intake air is no longer heated. At 416, the position of the EGR valve in the EGR system may be adjusted to flow a designated amount of exhaust gas to the engine. The EGR may be routed to the engine only during certain operating conditions, such as during particular speed-load regions. Thus, the EGR valve may be adjusted only if indicated by the current operating conditions. In some examples, when the intake air is being heated by the heater, the EGR may be disabled. However, during other examples, when the intake air is being heated by the heater, EGR may be routed to the engine if indicated by the operating conditions (e.g., if engine speed and load are within a threshold range). Method 400 then returns.

Thus, FIG. 4 provides for a method comprising, during a warm-up phase of an engine, heating intake air flowing to the engine with a heater positioned in a passageway of an intake of the engine; and for a given duration after the engine has reached a designated operating temperature, continuing to heat the intake air with the heater, the given duration based on an age of an exhaust aftertreatment device positioned in an exhaust of the engine. In one example, as the age of the exhaust aftertreatment device increases, the given duration increases. The passageway of the intake may be a bypass passage coupled across an intake air filter.

The method may further comprise, after the engine has reached the designated operating temperature, recirculating exhaust gas to the engine. If a temperature of the intake air upstream of the intake air filter is above a threshold temperature, the method may include routing at least a portion of the intake air through the bypass passage.

The method also includes, after the given duration, flowing the intake air to the engine without heating the intake air with the heater. The method may further comprise, after the engine reaches the designated operating temperature, if a temperature of the exhaust aftertreatment device drops below a threshold temperature, heating the intake air flowing to the engine with the heater.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A ducting system for feeding air and exhaust gases to an internal combustion engine and for discharging the exhaust gases produced by the internal combustion engine from the internal combustion engine, comprising
    a feed duct for feeding the air and exhaust gases to the internal combustion engine,
    a discharge duct for discharging the exhaust gases produced by the internal combustion engine from the internal combustion engine, in which one or more exhaust gas aftertreatment units are arranged for aftertreatment of the exhaust gases,
    a heater arranged in the feed duct, and
    a control unit storing instructions in memory executable to activate the heater to preheat the air that is fed to the internal combustion engine, wherein a duration of the activation of the heater and/or heat output given off by the heater is controlled as a function of a variable representing a state of ageing of at least one of the one or more exhaust gas aftertreatment units.

2. The ducting system as claimed in claim 1, wherein the variable representing the state of ageing of the at least one of the one or more exhaust gas aftertreatment units is a number of operating hours of the internal combustion engine, a mileage, and/or a total operating time of at the least one of the one or more exhaust gas aftertreatment units.

3. The ducting system as claimed in claim 1, further comprising an exhaust gas recirculation duct for returning the exhaust gases from the discharge duct into the feed duct.

4. The ducting system as claimed in claim 3, wherein the exhaust gas recirculation duct opens out in a discharge orifice into the feed duct and the heater is arranged upstream of the discharge orifice.

5. The ducting system as claimed in claim 3, wherein the exhaust gas recirculation duct opens out in a discharge orifice into the feed duct and the heater is arranged downstream of the discharge orifice.

6. The ducting system as claimed in claim 1, wherein the ducting system is coupled to an internal combustion engine.

7. The ducting system as claimed in claim 6, wherein the internal combustion engine is installed in a vehicle.

8. A method for operating a ducting system, comprising:
    feeding air and exhaust gases to an internal combustion engine by a feed duct;
    discharging exhaust gases produced by the internal combustion engine from the internal combustion engine by a discharge duct;
    treating the exhaust gases by one or more exhaust gas aftertreatment units arranged in the discharge duct; and
    preheating the air and/or the exhaust gases that are fed to the internal combustion engine with a heater arranged in the feed duct, the preheating a function of a variable representing a state of ageing of at least one of the one or more exhaust gas aftertreatment units.

9. The method as claimed in claim 8, wherein the preheating is performed only until the internal combustion engine and/or the one or more exhaust gas aftertreatment units have reached their respective operating temperatures.

10. The method as claimed in claim 8, wherein the preheating is performed for a period of time which extends beyond a point at which the internal combustion engine and/or the one or more exhaust gas aftertreatment units have reached their respective operating temperatures, wherein the period of time is increased with a number of operating hours of the internal combustion engine and/or the one or more exhaust gas aftertreatment units.

11. A method, comprising:
- during a warm-up phase of an engine, heating intake air flowing to the engine with a heater positioned in a passageway of an intake of the engine; and
- for a given duration after the engine has reached a designated operating temperature, continuing to heat the intake air with the heater, the given duration based on an age of an exhaust aftertreatment device positioned in an exhaust of the engine.

12. The method of claim 11, further comprising, after the engine has reached the designated operating temperature, recirculating exhaust gas to the engine.

13. The method of claim 11, wherein as the age of the exhaust aftertreatment device increases, the given duration increases.

14. The method of claim 11, wherein the passageway of the intake is a bypass passage coupled across an intake air filter.

15. The method of claim 14, further comprising if a temperature of the intake air upstream of the intake air filter is above a threshold temperature, routing at least a portion of the intake air through the bypass passage.

16. The method of claim 11, further comprising, after the given duration, flowing the intake air to the engine without heating the intake air with the heater.

17. The method of claim 11, further comprising, after the engine reaches the designated operating temperature, if a temperature of the exhaust aftertreatment device drops below a threshold temperature, heating the intake air flowing to the engine with the heater.

* * * * *